(12) United States Patent
Vermillion

(10) Patent No.: US 9,903,511 B2
(45) Date of Patent: Feb. 27, 2018

(54) DOUBLE ENDED CLIP

(71) Applicant: Bradley N. Vermillion, Highlands, TX (US)

(72) Inventor: Bradley N. Vermillion, Highlands, TX (US)

( * ) Notice: Subject to any disclaimer, the term of this patent is extended or adjusted under 35 U.S.C. 154(b) by 0 days.

(21) Appl. No.: 15/011,533

(22) Filed: Jan. 30, 2016

(65) Prior Publication Data

US 2017/0219127 A1 Aug. 3, 2017

(51) Int. Cl.
*F16L 3/137* (2006.01)
*F16B 2/22* (2006.01)
*F16L 3/12* (2006.01)

(52) U.S. Cl.
CPC .............. *F16L 3/137* (2013.01); *F16B 2/22* (2013.01); *F16L 3/1218* (2013.01)

(58) Field of Classification Search
CPC ......... F16L 3/137; F16L 3/1218; F16L 3/122; F16L 3/00; F16L 3/08; F16B 2/20; F16B 2/22; F16B 2/246
USPC ....... 248/228.8, 58, 61–63, 65, 72, 73, 74.1, 248/74.2, 74.3, 74.4
See application file for complete search history.

(56) References Cited

U.S. PATENT DOCUMENTS

| | | | |
|---|---|---|---|
| D34,263 S | 3/1901 | Bailey | |
| D15,622 S | 12/1901 | Preble | |
| D44,957 S | 12/1913 | Grizzard | |
| D46,019 S | 6/1914 | Cantrell et al. | |
| 1,698,796 A * | 1/1929 | Holmstrom | A47H 13/04 16/87.2 |
| 2,652,586 A * | 9/1953 | Ramsberger | A47H 13/04 16/87.2 |
| 2,884,478 A * | 4/1959 | Becker | H01R 4/186 174/94 R |
| 3,173,987 A * | 3/1965 | Potruch | F16L 3/13 174/38 |
| 4,406,042 A * | 9/1983 | McPhee | A61M 5/1418 24/129 A |
| 4,511,164 A | 4/1985 | Orchard | |
| 4,887,785 A * | 12/1989 | Blaich | A01K 39/00 24/716 |
| 4,979,714 A * | 12/1990 | Russell | A61M 5/1418 24/370 |
| D323,104 S | 1/1992 | Russell | |
| 5,469,607 A * | 11/1995 | Henningsson | A01G 9/22 24/30.5 S |
| 5,575,446 A * | 11/1996 | Swenson | A47G 33/10 248/304 |

(Continued)

FOREIGN PATENT DOCUMENTS

CN 303117841 3/2015

*Primary Examiner* — Nkeisha Smith
(74) *Attorney, Agent, or Firm* — John R. Casperson

(57) ABSTRACT

One embodiment of the invention provides a latchable plastic clip formed from a resilient main band body bent into a near closed "S" or "Figure 8" shape. The clip is useful when used in numbers for releasably suspending elongated objects such as wires, cords and hoses beneath and along supportive objects, such as rods, bars, railings, or pipes. It is also useful when used singularly for storing items such as ropes, straps, chains, harnesses, halters and reins by hanging them from support structure such as rods, bars, railings or pipes, coiling them first if necessary or desirable.

10 Claims, 5 Drawing Sheets

(56) References Cited

U.S. PATENT DOCUMENTS

| | | | |
|---|---|---|---|
| 5,645,254 A * | 7/1997 | Ng | A47G 1/17 248/205.5 |
| D387,652 S | 12/1997 | Carlson, Jr. | |
| D402,191 S | 12/1998 | Feder | |
| 6,059,241 A * | 5/2000 | Martone | F16B 2/10 24/16 PB |
| 6,155,526 A * | 12/2000 | Brown | A47G 33/10 248/205.1 |
| 6,367,118 B1 * | 4/2002 | Berfield | A47L 9/248 15/323 |
| D482,269 S | 11/2003 | Martello | |
| D492,188 S | 6/2004 | Goldberg | |
| D494,055 S | 8/2004 | Jonesl et al. | |
| 6,802,480 B1 * | 10/2004 | Martello | F16L 3/237 24/373 |
| 6,807,791 B2 * | 10/2004 | Herb | E04C 3/07 248/317 |
| 7,380,371 B2 * | 6/2008 | Jones | A01G 9/128 24/129 B |
| D577,574 S | 9/2008 | Liang | |
| D585,132 S | 1/2009 | Judd | |
| D594,738 S | 6/2009 | Kelleghan | |
| D600,544 S | 9/2009 | Klaus et al. | |
| D612,710 S | 3/2010 | Kelleghan | |
| D626,393 S | 11/2010 | Ormsbee | |
| 7,882,600 B2 * | 2/2011 | Judd | B65H 75/36 24/115 R |
| D646,556 S | 10/2011 | Kelleghan | |
| D669,764 S | 10/2012 | Kelleghan | |
| D686,058 S | 7/2013 | Paik et al. | |
| D698,232 S | 1/2014 | Weinberg | |
| D698,625 S | 2/2014 | Liang | |
| D698,626 S | 2/2014 | Ormsbee et al. | |
| 8,910,347 B1 * | 12/2014 | Wilcox | B65D 63/109 24/16 R |
| 9,188,152 B1 * | 11/2015 | Kacines | F16B 45/00 |

\* cited by examiner

US 9,903,511 B2

DOUBLE ENDED CLIP

FIELD OF THE INVENTION

In one embodiment, the invention relates to a double ended clip. In another embodiment, the invention relates to securing objects with a double ended clip.

BACKGROUND OF THE INVENTION

At construction and event sites, numerous cords, cables, hoses and the like present tripping hazards.

A clip to use on such items to reduce the risk of tripping and injury would be desirable.

Some items, such as ropes, cords, straps, bridles, halters and the like have a propensity to become entangled when stored, unless special steps are taken.

A clip to use on these items to provide near tangle-free storage would be desirable.

OBJECTS OF THE INVENTION

It is an object to provide a clip to secure and/or store elongated flexible objects.

SUMMARY OF THE INVENTION

One embodiment of the invention provides a clip formed from a resilient main band body. The band has a first end, a second end, a length, a width, a thickness, a plane of symmetry. The width is greater than the thickness and is transverse to the plane of symmetry. The resilient main band body is formed into a first closeable loop beginning near the first end, and a second closeable loop beginning near the second end. The resilient main band body has a generally near-closed S shape and is curved transversely to its thickness to form the first closeable loop and the second closeable loop.

The clip is useful when used in numbers for releasably suspending elongated objects such as wires, cords and hoses beneath and along supportive objects, such as rods, bars, railings, or pipes.

It is also useful when used singularly for storing items such as ropes, straps, chains, harnesses, halters and reins by hanging them from support structure such as rods, bars, railings or pipes, coiling them first if necessary or desirable.

DETAILED DESCRIPTION OF THE INVENTION

Figure 1:
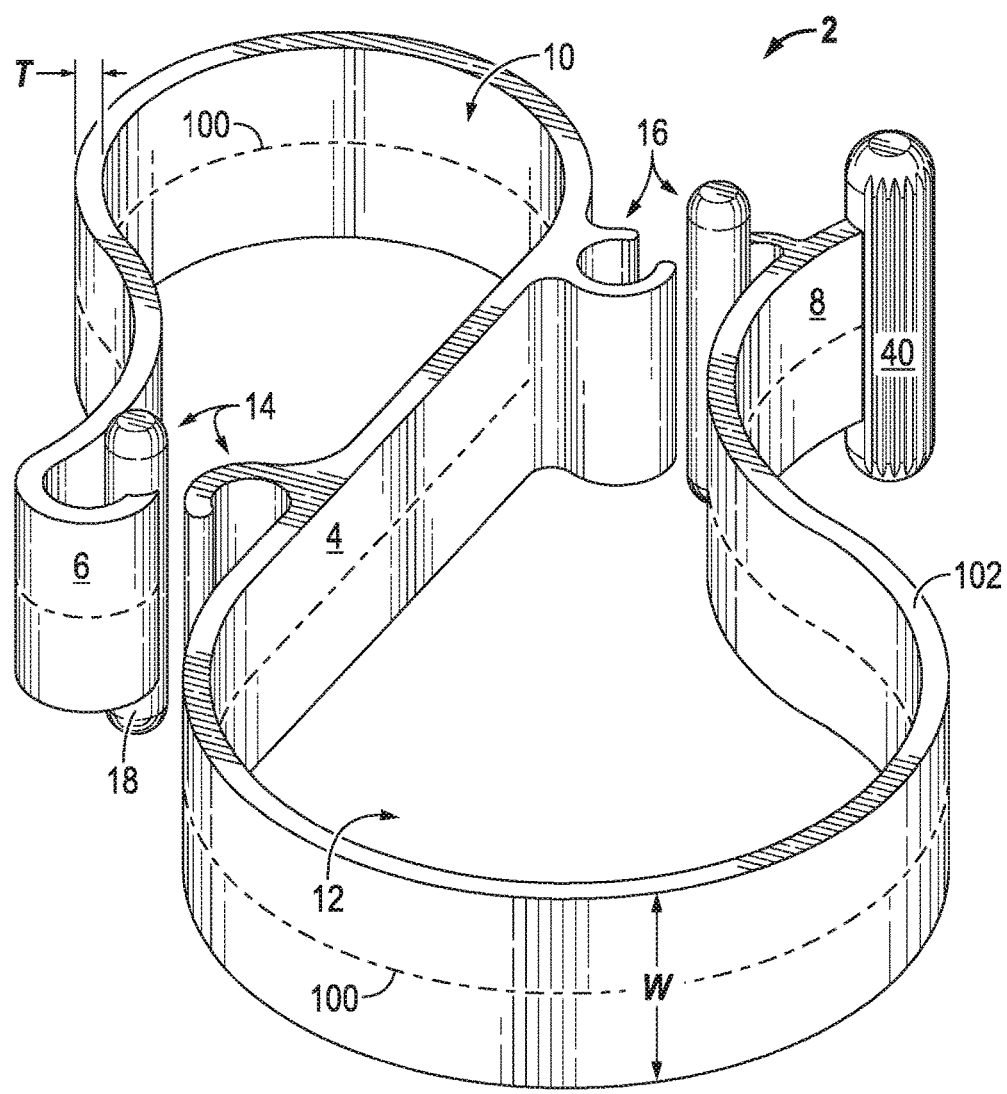
FIG. 1 is a first end top isometric view of a double ended clip, showing my new design.
Figure 2:
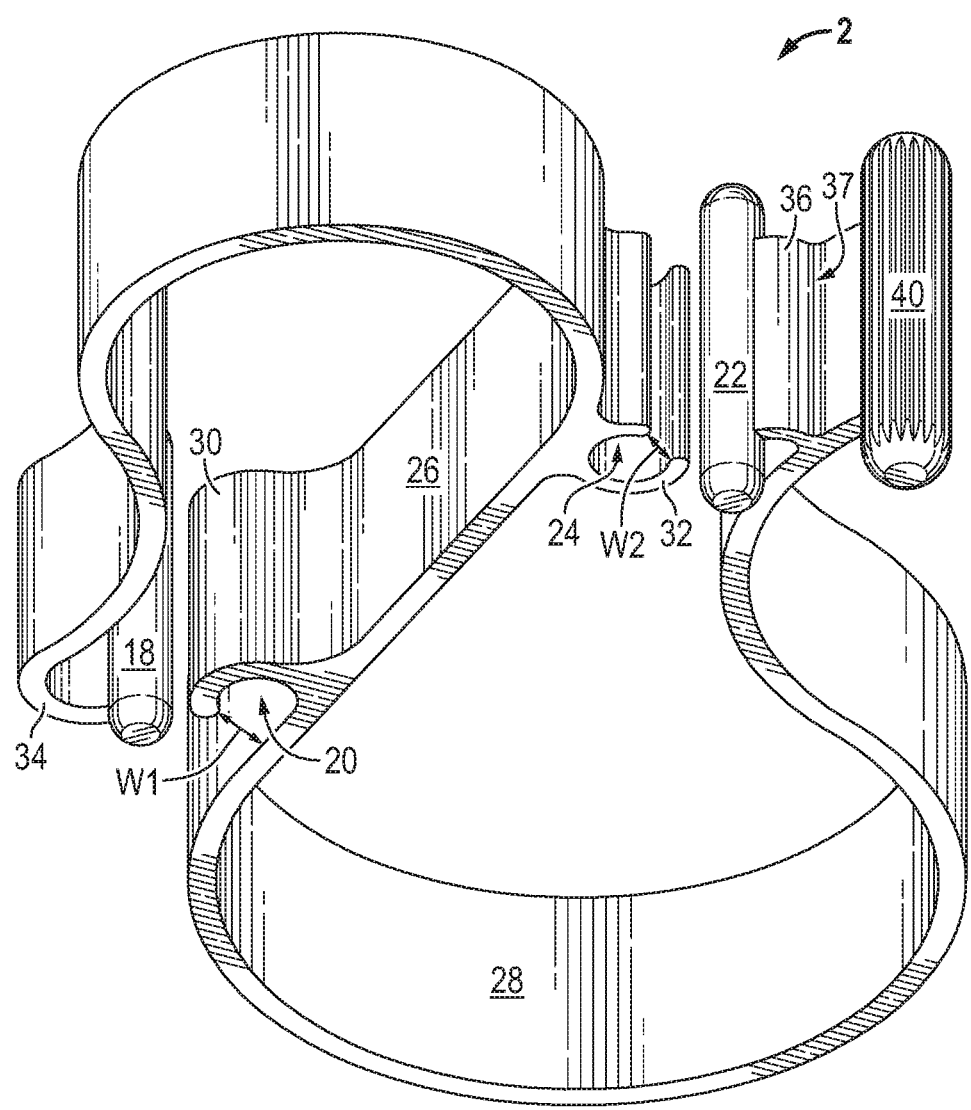
FIG. 2 is a second end bottom isometric view of the double ended clip of FIG. 1.
Figure 3:
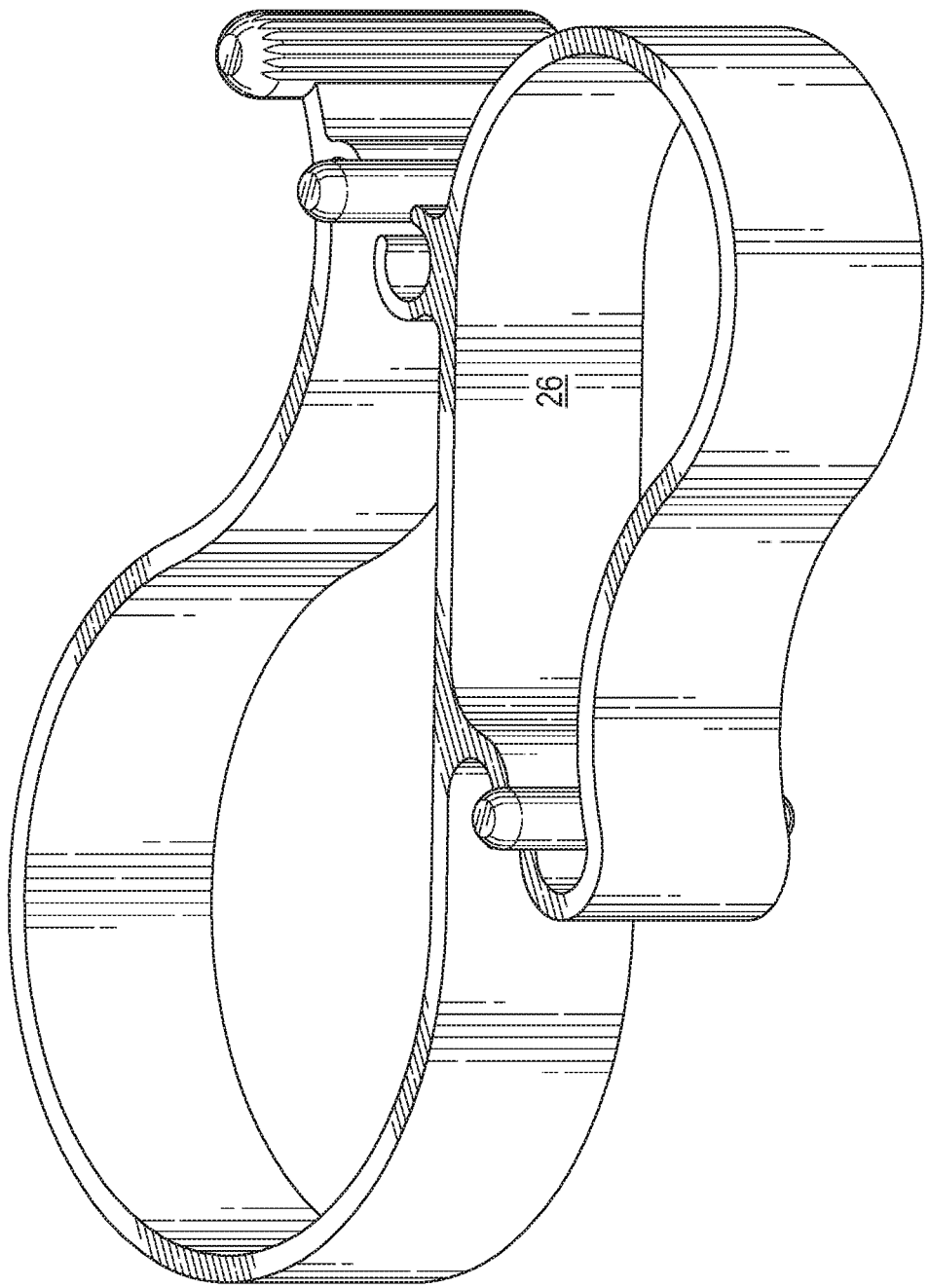
FIG. 3 is a first side top isometric view of the double ended clip of FIG. 1.
Figure 4:
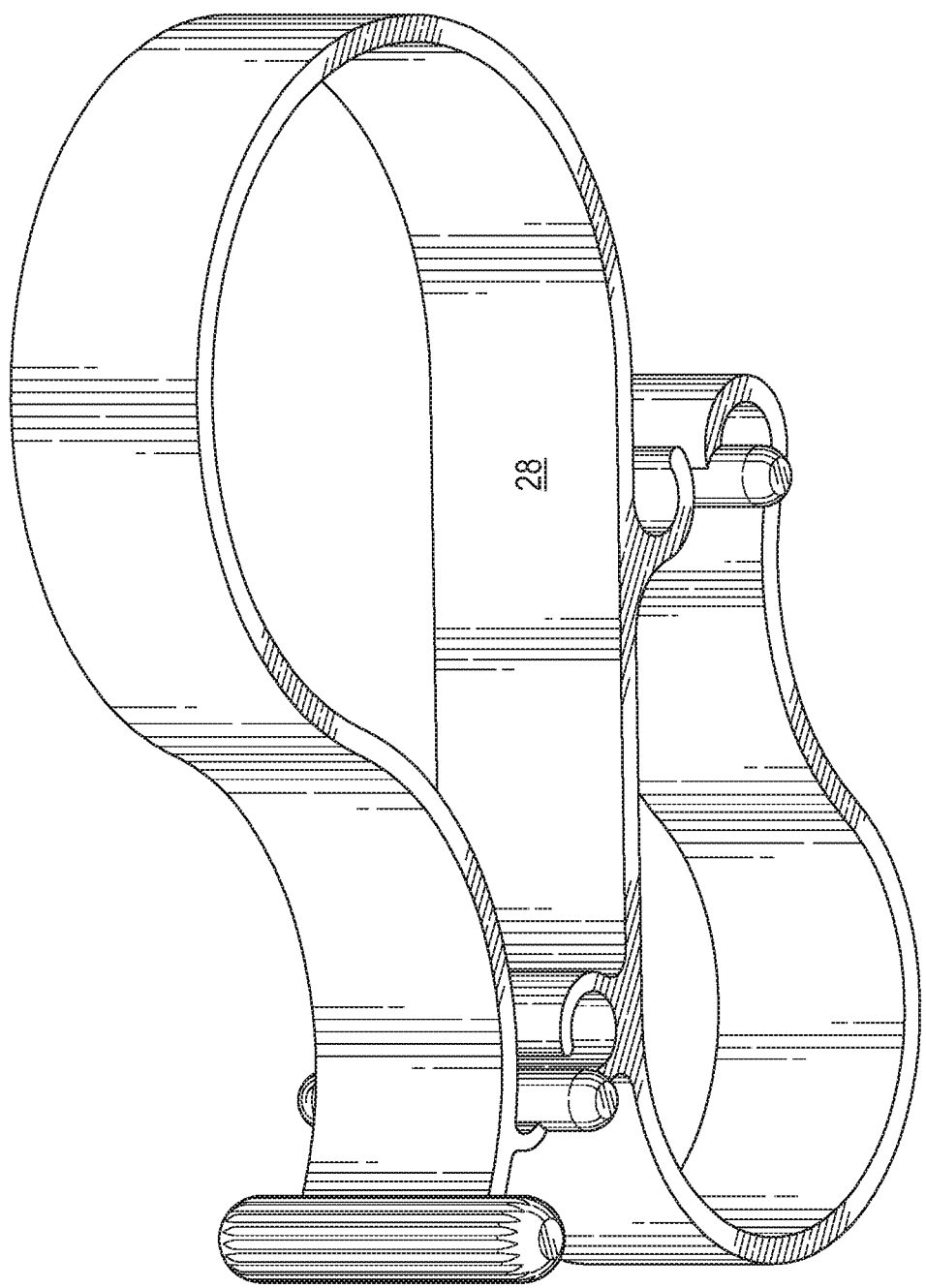
FIG. 4 is a second side bottom isometric view of the double ended clip of FIG. 1.

One embodiment of the invention provides a clip 2 formed from a resilient main band body 4. See FIG. 1. The band has a first end 6, a second end 8, a length as measured along an edge surface 102 from pin 18 at the first end to pin 40 at the second end, a width (W), a thickness (T), and a plane of symmetry the intersection of which with the band is indicated by the dashed line 100. The width is greater than the thickness and is transverse to the plane of symmetry. The resilient main band body is formed into a first closeable loop 10 beginning near the first end, and a second closeable loop 12 beginning near the second end. The resilient main band body has a generally near-closed S shape and is curved transversely to its thickness to form the first closeable loop and the second closeable loop. The loops can be open or closed depending on configuration. Preferably, the second closeable loop is larger than the first closeable loop, as measured by enclosed area, for example. When closed, the clip has generally an 8 shape.

In plan view, the loops when closed can be described in a preferred embodiment as having a major axis and a minor axis. The major axis is generally in the range of 1.1 to 2 times the minor axis, usually in the range of 1.2 to 1.8 times the minor axis, and preferably in the range of 1.4 to 1.6 times the minor axis. Preferably, the loops are generally teardrop shaped, more preferably, with the outer wall of the teardrops being concavely curved at the small end and being near circularly shaped at the big end.

Preferably, the clip further comprises first latch means 14 positioned on the resilient main band body for releasably closing the first loop and second latch means 16 positioned on the resilient main band body for releasably closing the second loop. More preferably, the first latch means comprises a pin 18 and a socket 20 and the second latch means comprises a pin 22 and a socket 24, the pins being placed into their respective sockets to form the latch.

In a preferred embodiment, placing a pin into a socket requires moving the pin out of the plane of symmetry against the resiliency of the resilient main band body, aligning the pin with the socket, and releasing the pin to enter the socket transversely urged by the resiliency of the resilient main band body. It may be necessary to give it a shove. The clip is preferably formed from plastic. A PC/ABS plastic has been used in a prototype clip substantially as shown in the drawings with good results.

In the illustrated embodiment of the invention, the resilient main band main body has a first side 26 and a second side 28. The first latch means comprises a first socket body 30 protruding from the first side of the resilient main band main body and having a generally cylindrical inside surface forming a first open-sidewall sided socket extending across the width of the first side of the resilient band main body. The first socket body defines an elongated opening having a width W1 facing generally away from the first loop. The second latch means comprises a second socket body 32 protruding from the second side of the resilient main band main body and having a generally cylindrical inside surface forming a second open-sidewall-sided socket extending across the width of the second side of the resilient main band body. The second socket body defines an elongated opening having a width W2 facing generally away from the second loop.

The generally cylindrical inside surface of the first socket body can be described as having a longitudinal axis normal to the plane of symmetry of the clip and the generally cylindrical inside surface of the second socket body can be described as having a longitudinal axis normal to the plane of symmetry of the clip.

The first latch means includes the first pin 18 which has a longitudinal axis positioned parallel to the longitudinal axis of the generally cylindrical surface of the first socket body. A first wall body 34 connects the first pin to the resilient band main body. The second latch means includes the second pin 22 which has a longitudinal axis positioned parallel to the longitudinal axis of the generally cylindrical surface of the second socket body. A second wall body 36 connects the second pin to the resilient band main body. It may be desirable to add material to the second wall body at 37 and opposite thereto since doing so won't interfere with the fit of the pin in the socket and will strengthen the wall.

Preferably, the first wall body and the second wall body are positioned so that the first pin and the second pin are located near the first socket body and the second socket body, respectively, when the first loop and the second loop are open, (unlatched position). The first pin and the second pin are moveable from a loop open to a loop closed position. In the loop closed (latched position), the first wall body passes through the elongated opening through the sidewall of the first socket body and the second wall body passing through the elongated opening through the sidewall of the second socket body.

The first wall body preferably extends from the resilient band main body from a location at or near the first end of the resilient band main body and is of the width of the resilient band main body. The first wall body curves toward the elongated opening through the sidewall of the first socket body. The second wall body extends from the resilient band main body from a location at or near the second end of the resilient band main body and is of the width of the resilient band main body. The second wall body curves toward the elongated opening through the sidewall of the second socket body.

In a preferred embodiment, each pin 18 and 22 has a length that is greater than the width of the resilient band main body and a diameter that is receivable by their respective sockets. Each pin 18 and 22 has a diameter greater than a width for the elongated openings through the sidewalls of their respective sockets so that the pins are retained in their respective sockets against forces in the plane of the clip. The pins 18 and 22 preferably each have a rounded first end and a rounded second end.

Preferably, a third pin 40 extends across the second end of the main band body and has a length greater than the width of the main band body.

Figure 5:
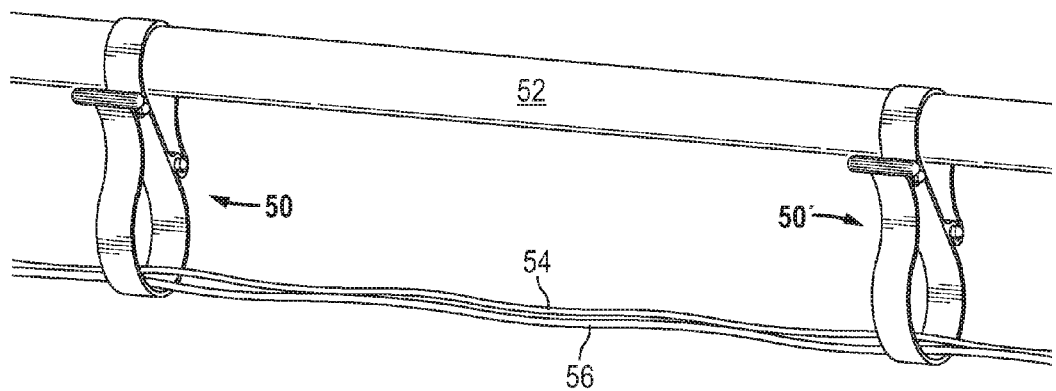
FIG. 5 is a pictorial illustration showing an embodiment the invention in a first use.
Figure 6:
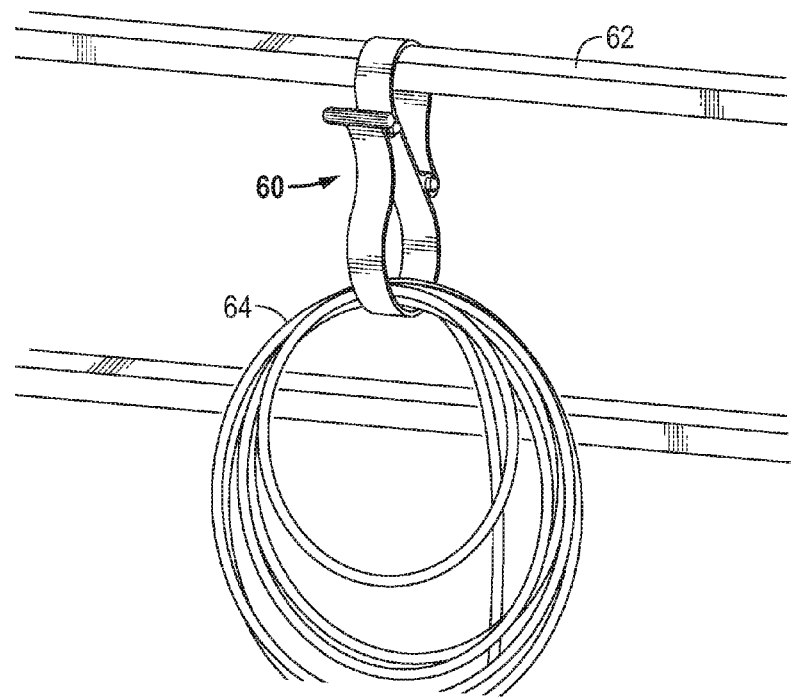
FIG. 6 is a pictorial illustration showing an embodiment of the invention in a second use.

The clip described herein is useful for releasably suspending elongated objects beneath rods, bars, railings, or pipes. FIG. 5 shows clips 50, 50' positioned on a railing 52. FIG. 6 show a clip 60 positioned on a bar 62. The clip is attached by encircling the rod, bar railing or pipe with the first closeable loop of the clip. The object to be suspended, for example wires 54, 56 in FIG. 5 or rope 64 in FIG. 6 are attached by encircling the elongated object with the second closeable loop.

In FIG. 5, the rod, bar, railing or pipe is encircled with clips at spaced apart locations, and the object(s) to be retained is also encircled by the clips to suspend the at least one elongated object beneath the rod, bar, railing or pipe. The loops are then closed and latched for reliability. Elongated object such as electrical cords, wiring, hydraulic hoses, pneumatic hoses, and tubing can be retained in this manner.

In FIG. 6, the first loop can be closed, and a coiled elongated object positioned in the second loop, which is then closed to store the coil. Besides coiled objects such as ropes, straps, chains and reins, objects such as halters and harnesses can also be stored with the inventive clips. The clip generally can be used for holding cords, hoses and electrical leads such as welding leads, off the ground in order to prevent these items from presenting tripping hazards. A first end of the clip is secured to a railing or fence, such as a pipe hand rail, angle iron, or square tubing via a positively latching gate. The second end of the clip can be opened or closed for adding and/or removing items from the device. The positive connection prevents the clip from slipping or otherwise coming off a support unintentionally.

Examples of items that can be secured with the invention include extension cords, power tool cords, Ethernet cords, telephone, computer or other data cords or cables; water hose, air hose, hydraulic hose, chemical or oil hoses, stage or theater speaker wires, microphone cords, instrument and lighting cords, and power leads.

Examples of items that can be stored with the invention include ropes, fall protection harnesses, tow straps, rigging rope or chains, livestock/ranching harnesses, halters, reins, lead ropes.

The latches (pins) are the same on both ends. There is an additional handle (grab pin) on the large end for easier use in the most common configuration, which is small end up (hanging off a hand rail), and large end down (holding cables, etc). The motion for opening and closing is to slide (pull) the pin to the side (left or right when in the vertical configuration).

While certain preferred embodiments have been described herein, the invention is not to be construed as being so limited, except to the extent that such limitations are found in the claims.

What is claimed is:

1. A clip formed from
a resilient main band body having a first side, a second side, a first end, a second end, a length, a width, a thickness, a plane of symmetry, the width being greater than the thickness and transverse to the plane of symmetry, the resilient band main body being formed into a first closeable loop beginning near the first end, and a second closeable loop beginning near the second end, the resilient main band body having a generally near-closed S shape and being curved transversely to its thickness to form the first closeable loop and the second closeable loop, said clip further comprising a first socket body positioned on the first side of the resilient main band body for releasably closing the first loop and a second socket body positioned on the second side of the resilient main band body for releasably closing the second loop, said first socket body defining a first elongated opening having a width and facing away from the first loop and leading to a first generally cylindrical inside surface having a longitudinal axis, said second socket body defining a second elongated opening having a width and facing away from the second loop and leading to a second generally cylindrical inside surface having a longitudinal axis, the first socket body for receiving a first pin having a longitudinal axis positioned parallel to the longitudinal axis of the first generally cylindrical inside surface of the first socket body, and a first wall body connecting the first pin to the resilient band main body, and the second socket body for receiving a second pin having a longitudinal axis positioned parallel to the longitudinal axis of the second generally cylindrical inside surface of the second socket body, and a second wall body connecting the second pin to the resilient band main body,
wherein the first pin has a diameter greater than a width of the first elongated opening and the second pin has a diameter that is greater than a width of the second elongated opening so that the first pin and the second pin each are retained in a respective socket against forces in the plane of symmetry, and placing the first pin or the second pin into the respective socket to close a loop requires moving the first pin or the second pin out of the plane of symmetry against the resiliency of the resilient main body, aligning the first pin or the second pin with the respective socket, and releasing the first pin or second pin to enter the respective socket transversely.

2. A clip
formed from
a resilient main band body having a first end, a second end, a length, a width, a thickness, a plane of symmetry, the width being greater than the thickness and transverse to the plane of symmetry, the resilient band main body being formed into a first closeable loop beginning near the first end, and a second closeable loop beginning near the second end, the resilient main band body having a generally near-closed S shape and being curved transversely to its thickness to form the first closeable loop and the second closeable loop,
said clip further comprising first latch means positioned on the resilient main band body for releasably closing the first loop and second latch means positioned on the resilient main band body for releasably closing the second loop,
wherein the resilient main band main body has a first side and a second side, and the first latch means comprises a first socket body protruding from the first side of the resilient main band main body and having a generally cylindrical inside surface forming a first open-sidewall sided socket extending across the width of the first side of the resilient band main body, said first socket body defining an elongated opening facing generally away from the first loop, and the second latch means comprises a second socket body protruding from the second side of the resilient main band main body and having a generally cylindrical inside surface forming second open-sidewall-sided socket extending across the width of the second side of the resilient main band body and defining an elongated opening facing generally away from the second loop,
wherein the generally cylindrical inside surface of the first socket body has a longitudinal axis normal to the plane of symmetry of the clip and the generally cylindrical inside surface of the second socket body has a longitudinal axis normal to the plane of symmetry of the clip,
wherein the first latch means further comprises a first pin having a longitudinal axis positioned parallel to the longitudinal axis of the generally cylindrical surface of the first socket body, and a first wall body connecting the first pin to the resilient band main body, and the second latch means further comprises a second pin having a longitudinal axis positioned parallel to the longitudinal axis of the generally cylindrical surface of the second socket body, and a second wall body connecting the second pin to the resilient band main body.

3. A clip as in claim 2 wherein the first wall body and the second wall body are positioned so that the first pin and the second pin are located near the first socket body and the second socket body, respectively, when the first loop and the second loop are open, and said first pin and said second pin are moveable from a loop open to a loop closed position, the first wall body passing through the elongated opening through the sidewall of the first socket body and the second wall body passing through the elongated opening through the sidewall of the second socket body when the first pin and the second pin are in loop closed positions.

4. A clip as in claim 3 wherein the first wall body extends from the resilient band main body from a location at or near the first end of the resilient band main body and is of the width of the resilient band main body, said first wall body curving toward the elongated opening through the sidewall of the first socket body and the second wall body extends from the band main body from a location at or near the second end of the resilient band main body and is of the width of the resilient band main body, said second wall body curving toward the elongated opening through the sidewall of the second socket body.

5. A clip as in claim 4 wherein each pin has a length that is greater than the width of the resilient band main body and a diameter that is receivable by their respective sockets, each pin having a diameter greater than a width for the elongated openings through the sidewalls of their respective sockets so that the pins are retained in their respective sockets against forces in the plane of symmetry.

6. A method for releasably suspending elongated objects beneath rods, bars, railings, or pipes, said method comprising attaching a clip formed from
a resilient main band body having a first side, a second side, a first end, a second end, a length, a width, a thickness, a plane of symmetry, the width being greater than the thickness and transverse to the plane of symmetry, the resilient band main body being formed into a first closeable loop beginning near the first end, and a second closeable loop beginning near the second end, the resilient main band body having a generally near-closed S shape and being curved transversely to its thickness to form the first closeable loop and the second closeable loop, said clip further comprising a first socket body positioned on the first side of the resilient main band body for releasably closing the first loop and a second socket body positioned on the second side of the resilient band main body for releasably closing the second loop, said first socket body defining a first elongated opening having a width and facing away from the first loop and leading to a first generally cylindrical inside surface having a longitudinal axis and defining a first socket, said second socket body defining a second elongated opening having a width and facing away from the second loop and leading to a second generally cylindrical inside surface having a longitudinal axis and defining a second socket, the first socket body for receiving a first pin having a longitudinal axis positioned parallel to the longitudinal axis of the first generally cylindrical inside surface of the first socket body, and a first wall body connecting the first pin to the resilient band main body, and the second socket body for receiving a second pin having a longitudinal axis positioned parallel to the longitudinal axis of the second generally cylindrical inside surface of the second socket body, and a second wall body connecting the second pin to the resilient band main body, wherein the first pin and the second pin each have a diameter that is greater than the width of the first elongated opening and the second elongated opening, respectively, wherein the first pin and the second pin each are retained in the first socket and second socket, respectively, against forces in the plane of symmetry, and placing the first pin or the second pin into the first socket and second socket, respectively, to close a loop requires moving the first pin or the second pin out of the plane of symmetry against the resiliency of the resilient main body, aligning the first pin or the second pin with the first socket or second socket, respectively, and releasing the first pin or second pin to enter the first socket or second socket, respectively, transversely, to a rod, bar, railing or pipe by encircling the rod, bar railing or pipe with the first closeable loop of the clip, attaching the clip to the elongated objects by encircling the elongated objects with the second closeable loop, and closing the first loop and the second loop by transversely receiving the first pin and the second pin in the first socket and the second socket, respectively, wherein the pins are transversely urged into the sockets defined by the socket bodies by the resilient main band body.

7. A method as in claim 6 further comprising encircling the rod, bar, railing or pipe with the first closeable loop of a plurality of clips at spaced apart locations, and encircling the elongated objects with the second closeable loops of the plurality of clips to suspend the elongated objects beneath the rod, bar, railing or pipe, and closing the first loops and the second loops of the plurality of clips by transversely receiving the first and second pins in their respective first and second socket bodies, wherein the pins are transversely urged into the socket bodies by the resilient main band bodies.

8. A method as in claim 7 wherein the elongated object are selected from electrical cords, wiring, hydraulic hoses, pneumatic hoses, and tubing.

9. A method for releasably attaching elongated objects to rods, bars, railings or pipes for storing the elongated objects, said method comprising attaching a clip
formed from
a resilient main band body having a first side, a second side, a first end, a second end, a length, a width, a thickness, a plane of symmetry, the width being greater than the thickness and transverse to the plane of symmetry, the resilient band main body being formed into a first closeable loop beginning near the first end, and a second closeable loop beginning near the second end, the resilient main band body having a generally near-closed S shape and being curved transversely to its thickness to form the first closeable loop and the second closeable loop, said clip further comprising a first socket body positioned on the first side of the resilient main band body for releasably closing the first loop and a second socket body positioned on the second side of the resilient main band body for releasably closing the second loop, said first socket body defining a first elongated opening having a width and facing away from the first loop and leading to a first socket defined by a generally cylindrical inside surface having a longitudinal axis, said second socket body defining a second elongated opening having a width and facing away from the second loop and leading to a second socket defined by a second generally cylindrical inside surface having a longitudinal axis, the first socket body for receiving a first pin having a longitudinal axis positioned parallel to the longitudinal axis of the first generally cylindrical inside surface of the first socket body, a first wall body connecting the first pin to the resilient band main body, the second socket body for receiving a second pin having a longitudinal axis positioned parallel to the longitudinal axis of the second generally cylindrical inside surface of the second socket body, and a second wall body connecting the second pin to the resilient band main body, wherein the first pin and the second pin each has a diameter that is greater than the width of the first elongated opening and the second elongated opening, respectively, wherein the first pin and the second pin each are retained in respective sockets against forces in the plane of symmetry, and placing the first pin or the second pin into the respective socket to close a loop requires moving the first pin or the second pin out of the plane of symmetry against the resiliency of the resilient main body, aligning the first pin or the second pin with the respective socket, and releasing the first pin or second pin to enter the respective socket transversely, to a rod, bar, railing or pipe by encircling the rod, bar railing or pipe with the first closeable loop of the clip, closing the first loop, positioning a coiled elongated object in the second loop, and closing the second loop to store the coil, wherein closing the first loop and the second loop requires moving the first pin and the second pin out of the plane of symmetry against the resiliency of the resilient main body, aligning the first pin and the second pin with the respective sockets, and releasing the first pin and the second pin to enter the respective sockets transversely with the resiliency of the resilient main body.

10. A method as in claim 9 where the elongated objects are selected from ropes, straps, chains, harnesses, halters, and reins.

* * * * *